Figure 1:
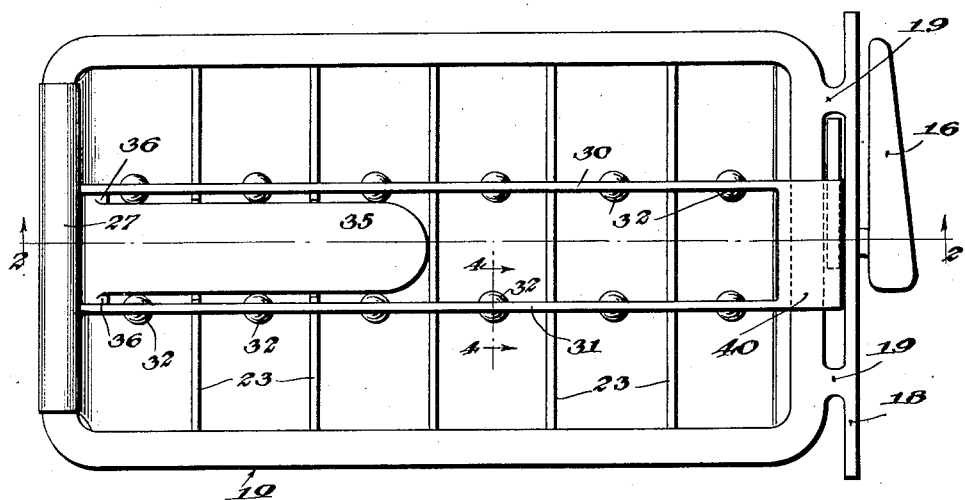

Oct. 31, 1933.    M. K. BUCHANAN ET AL    1,932,689
ICE CUBE PAN
Filed May 16, 1932    2 Sheets-Sheet 1

WITNESS
*Lawrence O. Hankin*

INVENTORS
*M. K. Buchanan,*
*A. G. Horton,*
BY
*Munn & Co.*
ATTORNEYS

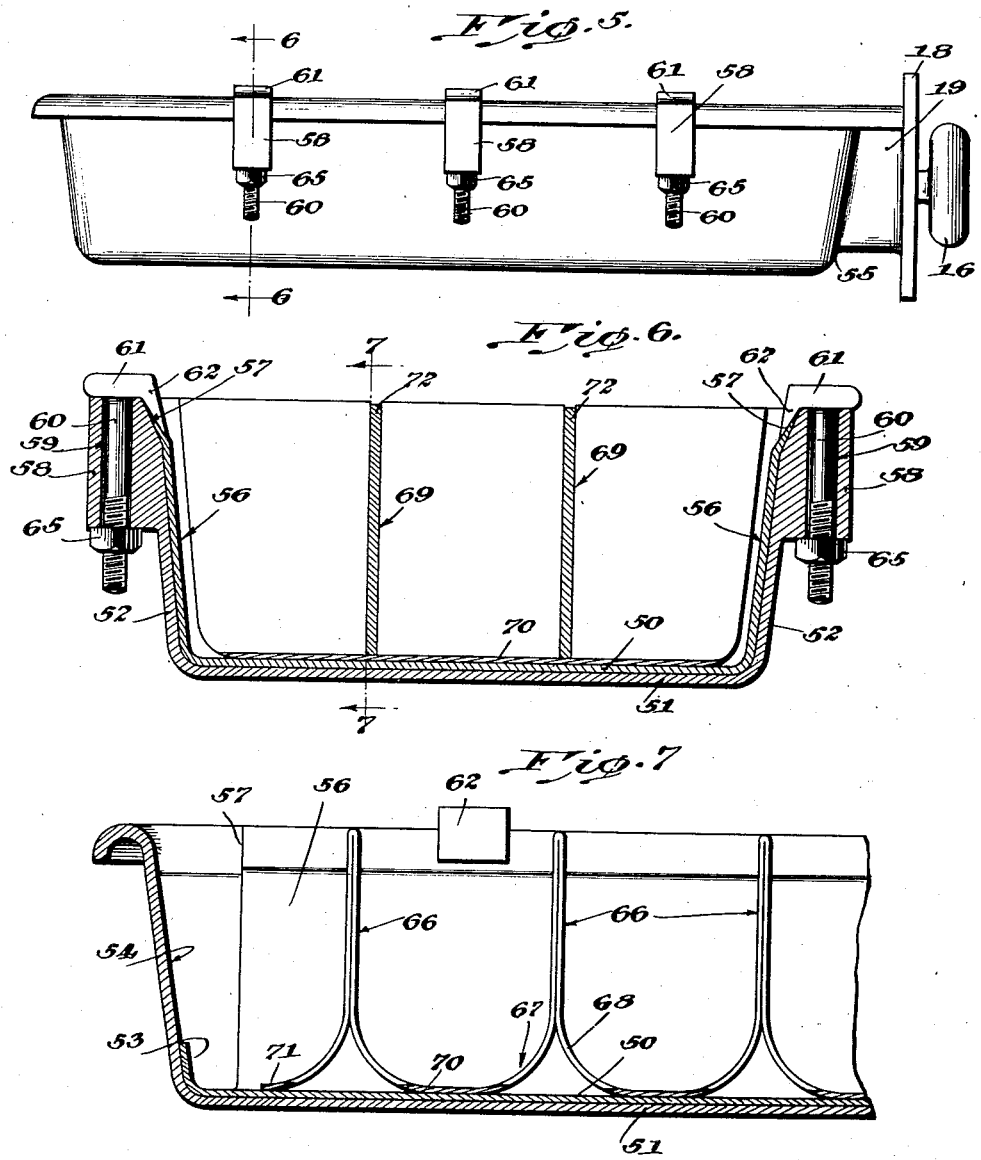

Patented Oct. 31, 1933

1,932,689

UNITED STATES PATENT OFFICE 1,932,689

ICE CUBE PAN

Michael K. Buchanan and Albert G. Horton, Ocean View, Va.

Application May 16, 1932. Serial No. 611,688

12 Claims. (Cl. 62—108.5)

This invention relates to ice cube pans.

An object of the invention is the provision of an ice cube pan having a false bottom formed of flexible material with the bottom folded upon itself at spaced intervals to provide transverse division plates forming a grid member, the plates being slotted to receive longitudinal plates of a movable grid member with means for raising the movable grid member for removing ice cubes from the pan.

A further object of the invention is the provision of an ice cube pan having a false bottom which is releasably retained within the pan and formed with division plates to provide a grid member, a movable grid member co-operating with the first-mentioned grid member to form ice cube molds, means being employed for raising the second grid member for removing the ice cubes from the pan, the first-mentioned grid member being removable from the pan so that the pan may be employed for other purposes when the grids are unnecessary.

A further object of the invention is the provision of an ice cube pan having a plate formed integrally with one end of the pan and spaced from said end, a cam being disposed within the space between the plate and the adjacent end of the pan for engaging a lip on a movable grid member when the cam is rotated for removing the ice cubes from the pan.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 2:
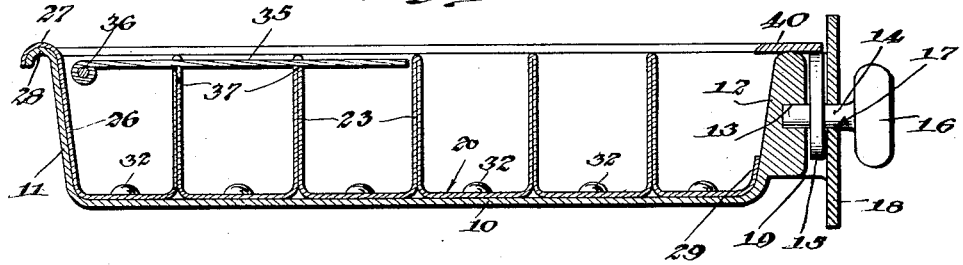
Figure 3:
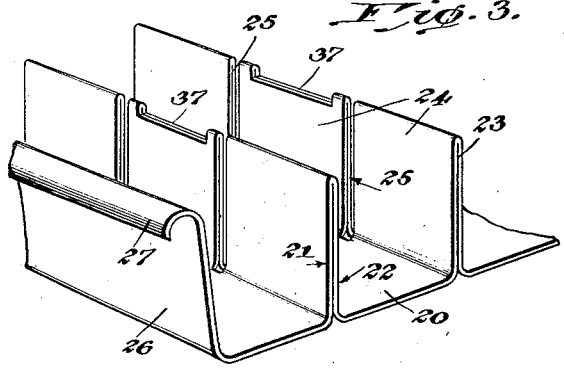
Figure 4:
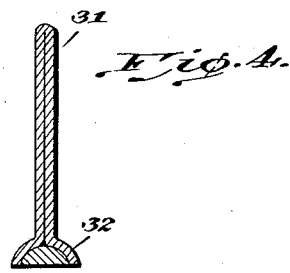

In the drawings:

Figure 1 is a plan view of an ice cube pan constructed in accordance with the principles of our invention, Figure 2 is a longitudinal vertical section taken along the line 2—2 of Figure 1, Figure 3 is a fragmentary view in perspective of a combined false bottom and grid member, Figure 4 is a transverse vertical section taken along the line 4—4 of Figure 1, Figure 5 is a side view of a modified form of the pan, Figure 6 is a transverse vertical section taken along the line 6—6 of Figure 5, and Figure 7 is a fragmentary longitudinal vertical section taken along the line 7—7 of Figure 6.

Referring more particularly to Figs. 1 to 4, inclusive, 10 designates the bottom of a pan and 11 and 12 designate the end walls. The wall 12 is thickened and is provided with a bearing 13 to receive the inner end of a shaft 14 to which is secured a cam 15. An operating handle 16 is secured to the outer end of the shaft 14. The outer end of the shaft is rotatably mounted in a passage 17 formed in a plate 18.

The plate 18 is spaced from the thickened end wall 12 and the cam 15 is located in the space between the plate 18 and the end wall 12. Connecting pieces 19 spaced on opposite sides of the cam member 15 connects the plate 18 with the end wall 12. It will be noted that the plate, the connecting members 19 and the end wall 12 are all formed integrally.

A false bottom, generally designated by the numeral 20, is located upon the bottom 10 and this bottom is bent upon itself intermediate its ends, as shown at 21 and 22, to form vertically disposed division walls 23. These walls are spaced in a predetermined manner for a purpose which will be presently explained.

The bottom 20 and likewise the partition walls are formed of a relatively thin flexible metal so that the sections 24 of the division walls 23 may be flexed or bent due to the fact that the material forming the bottom of the walls has a certain amount of resiliency, the sections 24 will move back in place after they have been moved from their normal vertical position. The sections 24 are formed by slotting the division wall 23 as shown at 25.

One end of the bottom 20 is provided with a flange 26 which lies in flat contact with the end wall 11 of the pan. The outer free edge of the flange is curved, as shown at 27, to conform to the curvature of the bead 28 formed on the end wall 11. The opposite edge of the false bottom 20 is curved upwardly a short distance, as shown at 29, and lies in flat contact with the inner face of the end wall 12.

A second grid member consists of a pair of longitudinally disposed plates 30 and 31 which are received by the slots 25 in the division plates 23. The division plates 30, 31 may be formed of a single strip of metal or a single strip of metal may be bent upon itself, as shown in Figure 4. Lugs 32 are formed upon the opposite faces of the longitudinally disposed plates 30 and 31 and provides means for aiding in elevating the ice cubes when the second grid member is raised from the pan.

A lever 35 is pivotally mounted at 36 on the upper ends of the plates 30 and 31. This lever rests in cutout portions 37 formed in the upper end of the intermediate sections 24 of the division plates 23. Thus the lever when located within the pan will lie below the level of the upper edges of the pan.

The forward ends of the plates 30 and 31 are connected together by a bridging member 40 which is in the form of a lip extending over the cam 15 and normally resting upon the upper edge of the end wall 12 of the pan.

The false bottom 20 is secured in any approved manner as by soldering or welding to the bottom 10 so that the bottom will be held stationary at all times.

Water is placed in the pan and inserted in the refrigerator. After the water has been frozen the pan may be removed and the handle or lever 16 is revolved, causing rotation of the cam 15 which engages the lip 40 elevating the same and likewise the longitudinally disposed plates 30 and 31 forming the movable grid member of the pan. The raising of these plates at their forward ends in connection with the lugs 32 will break all of the cubes loose so that the lever 35 may be moved outwardly and engage the curved portion 27 of the flange 26 whereby the second grid member will be removed entirely from the pan. During the operation of the raising of the plates 30 and 31 of the movable grid member, the sections 24 of the division plates 23 being flexible will be moved slightly towards the front or rear walls of the pan and thus aid in readily breaking the cubes from their connections.

Referring more particularly to Figs. 5 to 7, inclusive, it will be seen that a modified form of the pan is disclosed in which a false bottom 50 rests upon a bottom 51 of the pan 52. This false bottom at its opposite ends is provided with an upturned flange 53 in neat contact with an end wall 54 or 55 of the pan. The side walls 56 of the false bottom extend upwardly along the longitudinal side walls of the pan and terminate adjacent the upper edges of the side walls, as shown at 57.

At spaced intervals along the side walls of the pan are formed blocks 58 provided with passages 59 to receive bolts 60. These bolts are provided with a head 61 which rests upon the upper edge of the block 58 and is provided with a lip 62 engaging over the upper edge of the side walls 56 of the false bottom when the nuts 65 are screwed into position on the lower threaded end of the bolt 60. The upper edges of the side walls 56 of the false bottom are securely clamped in place.

A sheet of flexible and resilient metal is bent upon itself intermediate the ends at spaced intervals to provide transverse division plates 66. These division plates are provided with slots 69 which extend through the curved portions 67 of the division plates, as shown at 68. The portions 70 of the flexible sheet which connects the division plates 66 together are secured, as shown at 70, to the false bottom 50. The ends of the flexible sheet, as shown at 71, are also soldered or welded to the false bottom. A pair of longitudinally disposed plates 72 and 73 are received by the slots 69 and these are connected together at their forward ends and at their rear ends to provide at one end a lip, as shown in Fig. 1, which is engaged by a cam for raising the movable grid member while the relatively stationary grid member, represented by the division plate 66, is retained in place by the member 62. In other words, the construction shown in Figs. 5 to 7, inclusive, is substantially identical with that shown in Figs. 1 and 4 with the exception that the false bottom 50 may be removed entirely from the pan so that the pan may be used for other purposes such as the manufacture of ice cream. It will be appreciated, however, that the nuts 65 will have to be loosened in order that the bolts 60 may be elevated sufficiently to permit the flanges 56 or the false bottom to be released from the clamps.

It will be seen by this construction that the entire grid construction within the pan may be removed while on the other hand one of the grid members may be held stationary by the clamps 62 while the other is being removed. The portions 67 of the bent flexible material are curved so that the ice cubes will have a curved bottom portion whereby they may be more readily removed from the ice cube pan.

The construction shown in Figs. 5 to 7, inclusive, provides in effect an auxiliary pan since the bottom 50, the side walls 56, one end wall 53 and the opposite end wall which is similar to the wall 26 shown in Fig. 2 forms a pan which neatly fits similar elements of the pan.

We claim:

1. In an ice cube pan, a false bottom seated on the bottom of the pan and having transverse division plates rising therefrom in spaced relation to form a relatively stationary grid member, means for retaining the false bottom in position, a longitudinally disposed movable grid member co-operating with the relatively stationary grid member to provide ice cube forming compartments, and means for raising the removable grid member and for breaking the ice cubes away from the stationary grid member.

2. In an ice cube pan, a false bottom seated on the bottom of the pan and having transverse division plates rising therefrom in spaced relation to form a relatively stationary grid member, the plates being formed of flexible material, means for retaining the false bottom in position, a longitudinally disposed removable grid member co-operating with the relatively stationary grid member to provide ice cube forming compartments, and means for raising the removable grid member and for breaking the ice cubes away from the stationary grid member.

3. In an ice cube pan, a false bottom seated on the bottom of the pan and having transverse division plates rising therefrom in spaced relation to form a relatively stationary grid member, the plates being formed of flexible material, means for retaining the false bottom in position, a longitudinally disposed removable grid member co-operating with the relatively stationary grid member to provide ice cube forming compartments, means for raising the removable grid member and for breaking the ice cubes away from the stationary grid member, the plates and false bottom being formed of a relatively thin flexible sheet of metal, the sheet being bent upon itself transversely at spaced intervals to form the division plates.

4. In an ice cube pan, a false bottom supported on the bottom of the pan and formed of a thin sheet of flexible material, the false bottom at spaced intervals being bent upon itself to form transverse division plates of a relatively stationary grid member, means for retaining the false bottom in position, the division plates having vertical slots, a movable grid member having longitudinal plates received by the slots in the transverse plates to form a plurality of ice cube molds, and means for forcing the movable grid member away from the stationary grid member and for breaking the ice cubes away from the pan and stationary grid member.

5. In an ice cube pan, a false bottom supported on the bottom of the pan and formed of a thin sheet of flexible material, the false bottom at spaced intervals being bent upon itself to form transverse division plates of a relatively stationary grid member, means for retaining the false bottom in position, the division plates having vertical slots, a movable grid member having longitudinal plates received by the slots in the transverse plates to form a plurality of ice cube molds, means for forcing the movable grid member away from the stationary grid member and for breaking the ice cubes away from the pan and stationary grid member, the longitudinal plates having means on the lower edges thereof for aiding in lifting the ends from the pan when the movable grid member is elevated.

6. In an ice cube pan, a relatively stationary grid member in the pan including spaced partitions, a movable grid member in the pan and co-operating with the stationary grid member to form ice cube molds, the end edges of the partitions being free of connection with the side walls of the pan, the stationary grid member being formed of flexible metal so that the partitions may be flexed, and means for raising the movable grid member for removing the ice cubes from the pan.

7. In an ice cube pan, a false bottom resting on the bottom of the pan, transverse division plates rising at spaced intervals from the false bottom and forming with said bottom a relatively stationary grid member, means for releasably retaining the false bottom and plates in the pan, a movable grid member co-operating with the relatively stationary grid to form ice cube molds, and means for raising the movable grid member for removing the ice cubes from the pan.

8. In an ice cube pan, a false bottom resting on the bottom of the pan, transverse division plates rising at spaced intervals from the false bottom and forming with said bottom a relatively stationary grid member, means for releasably retaining the false bottom and plates in the pan, a movable grid member co-operating with the relatively stationary grid to form ice cube molds, means for raising the movable grid member for removing the ice cubes from the pan, the false bottom being formed of flexible materials and bent upon itself at intervals to form the division plates.

9. In an ice cube pan, a false bottom resting on the bottom of the pan, flanges projecting from the side edges of the false bottom, lying in flat contact with the side walls of the pan and terminating adjacent the upper edges of said walls, clamps carried by the side walls and engaging the free edges of the flanges for clamping the flanges and likewise the false bottom in position, transverse division plates rising in spaced relation from the false bottom, a movable grid member co-operating with the division plates to form ice cube molds, and means for raising the grid member for removing the cubes from the pan.

10. In a device of the character described, a main pan, an auxiliary pan located in the main pan and having its end and side walls lying in flat contact with the respective end and side walls of the main pan, means for removably retaining the auxiliary pan in the main pan, transverse division walls rising from the bottom of the auxiliary pan, a removable grid member co-operating with the division plates to form ice cube molds, and means for raising the grid member for breaking the ice cubes loose from the pan.

11. In a device of the character described, a main pan, an auxiliary pan located in the main pan and having its end and side walls lying in flat contact with the respective end and side walls of the main pan, means for removably retaining the auxiliary pan in the main pan, transverse division walls rising from the bottom of the auxiliary pan, the division walls being formed of flexible material, a removable grid member co-operating with the division plates to form ice cube molds, and means for raising the grid member for breaking the ice cubes loose from pan.

12. In an ice cube pan, a relatively stationary grid member in the pan including spaced partitions formed of flexible material, a movable grid member in the pan and cooperating with the spaced partitions to form ice cube molds, means for raising one end of the movable grid member so that the movable grid member will be tilted at an angle to the bottom of the pan for causing flexing of the spaced partitions to facilitate the breaking of the ice cubes from the stationary and movable grid members.

MICHAEL K. BUCHANAN.
ALBERT G. HORTON.